United States Patent Office 3,358,445
Patented Dec. 19, 1967

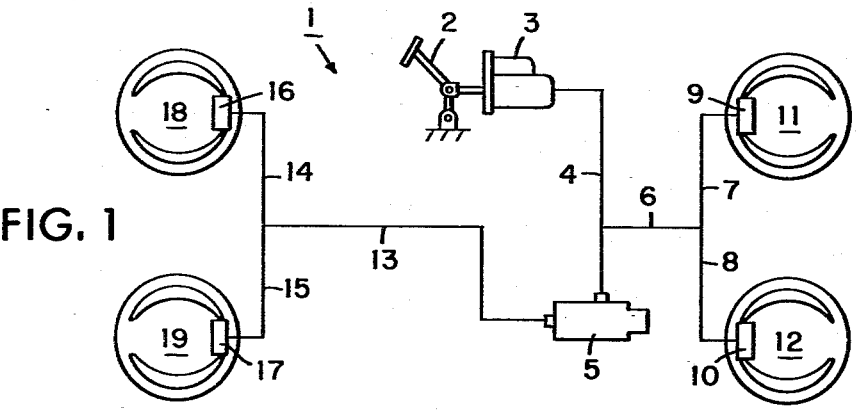
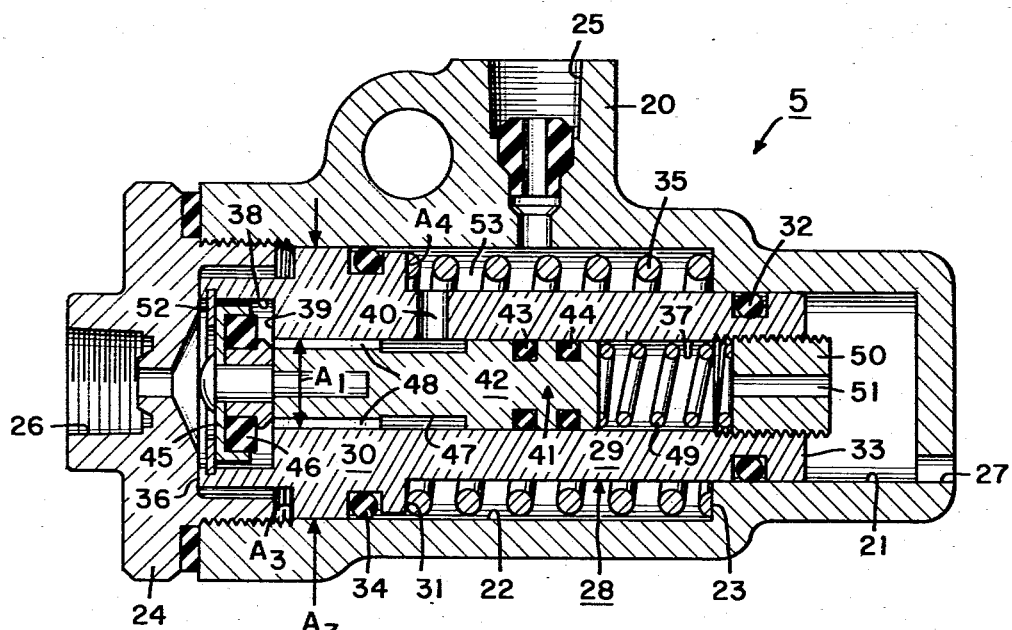
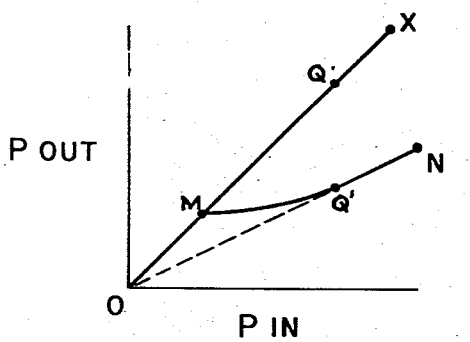
INVENTOR
EUGENE E. WALLACE
BY

3,358,445
CONTROL VALVE
Eugene E. Wallace, Kirkwood, Mo., assignor, by mesne assignments, to Tung-Sol Electric Inc., Newark, N.J., a corporation of Delaware
Filed Sept. 28, 1965, Ser. No. 490,983
7 Claims. (Cl. 60—54.5)

ABSTRACT OF THE DISCLOSURE

A ratio changing control valve having differential valve means and piston means for effecting a ratio change between fluid pressure supplied to said control valve and fluid pressure applied therefrom after the magnitudes of the supplied and applied fluid pressures attain a predetermined value, and resilient means compressed by said piston means to store the energy thereof for assisting in the ratio change.

---

This invention relates to fluid pressure systems and more particularly to a control valve for use in such a fluid pressure system.

It is well known that during a braking application for the deceleration of a vehicle, a dynamic weight differential between the front and rear wheels is created by an inertia weight shift toward the front of the vehicle. In the past, to compensate for this inertia weight shift the vehicle fluid pressure system was provided with a control valve which, in response to a predetermined deceleration of the vehicle, established a fluid pressure differential between the front and rear brakes for a greater energization of the front brakes than the rear brakes. An undesirable or disadvantageous feature of these prior art control valves was that after the predetermined deceleration occurred, the fluid pressure at the front brakes continued to increase while the fluid pressure at the rear brakes remained substantially constant for a period of time before increasing in proportion to the fluid pressure at the front brakes so that a smooth transition into the fluid pressure differential between the front and rear brakes was not effected.

It is therefore the general object of the present invention to provide a novel control valve which overcomes the aforementioned undesirable feature.

Another object of the present invention is to provide a novel control valve for effecting a fluid pressure differential between the front and rear brakes to proportion the braking force of the front and rear brakes more closely to the amount of dynamic weight on the front and rear wheels during a braking application.

Another object of the present invention is to provide a novel control valve which initially permits substanially simultaneous energization of the front and rear brakes and which, after the attainment of a predetermined fluid pressure in the system, increases the fluid pressure at the front and rear brakes in a predetermined ratio to establish a fluid pressure differential therebetween.

Another object of the present invention is to provide a novel control valve for use in a fluid pressure system having means therein for storing energy during the initial energization of the front and rear brakes, until pressure fluid communication between the front and rear brakes is interrupted at a predetermined fluid pressure in the system, and thereafter the stored energy is released to assist in effecting a fluid pressure differential between the vehicle front and rear brakes.

Still another object of the present invention is to provide a control valve for use in a vehicle fluid pressure system which at a predetermined fluid pressure in said system interrupts pressure fluid flow to the rear brakes and which, in response to initial fluid pressure, loads a cooperating spring until the pressure fluid flow is interrupted, and thereafter the cooperating spring unloads to assist in increasing the fluid pressure at the rear brakes in a predetermined ratio to the increase of fluid pressure at the front brakes.

Still another object of the present invention is to provide a control valve of simplified construction and economy of manufacture.

These and other objects and advantageous features will become apparent hereinafter.

Briefly, the present invention comprises a control valve having a housing with a pair of ports therein, a pair of members movable to store energy until said members, in response to a predetermined fluid pressure, interrupt pressure fluid communication between said ports, and said members being thereafter movable to release the stored energy increasing the fluid pressure at one of said ports to a value proportional to the fluid pressure at the other of said ports.

In the drawings which illustrate embodiments of the present invention,

FIG. 1 is a diagrammatic view of a fluid pressure system having a control valve therein embodying the present invention, FIG. 2 is a sectional view showing the control valve of FIG. 1 in cross-section, and FIG. 3 is a graphical representation of the brake pressure as effected by the control valve.

Referring to the drawings in detail and in particular to FIG. 1, a fluid pressure system 1 is provided with a brake pedal 2 operably connected to a fluid pressure generating means or master cylinder 3, and a delivery conduit 4 connects said master cylinder with the inlet port of the control or ratio changing valve 5. Another conduit 6 has one end intersecting the delivery conduit 4 and the other end thereof branches at 7, 8 for connection with servo motors or wheel cylinders 9, 10 of the front wheel brake assemblies 11, 12. A conduit 13 has one end connected with the outlet port of the control valve 5 and the other end thereof branches at 14, 15 for connection with servo motors or wheel cylinders 16, 17 of the rear wheel brake assemblies 18, 19.

Referring now to FIG. 2, the control valve 5 is provided with a housing 20 having an axially aligned bore and counterbore 21, 22 therein, and a radial shoulder 23 is provided at the juncture of said bore and counterbore. The rightward end of the bore 21 is closed by the housing 20, and the leftward end of the counter bore 22 is closed by a closure member 24 threadedly received therein. An inlet port 25 which receives the conduit 4, as previously mentioned, is provided in the housing 20 intersecting the counterbore 22 adjacent the mid-portion thereof, and an outlet port 26 which receives the conduit 13, as previously mentioned, is provided in the closure member 24 connecting with the leftward end of the counterbore 22. A venting passage 27 is also provided in the housing 20 connecting with the rightward end of the housing bore 21.

A stepped piston member, indicated generally at 28, is provided with a smaller body or sleeve portion 29 slidably received in the housing bore 21 and a larger head or control portion 30 slidably received in the housing counterbore 22 intermediate the inlet and outlet ports 25, 26, and a radial shoulder or control portion rightward end 31 is defined at the juncture of said body portion and said control portion. A peripheral seal 32 is provided on the piston body portion 29 adjacent the rightward end 33 thereof in sealing engagement with the housing bore 21, and another peripheral seal 34 is provided in the piston control portion 30 in sealing engagement with the housing counterbore 22. An energy storing spring 35 is provide in concentric relation with the piston body portion 29 and is biased between the housing shoulder 23 and the piston shoulder 31 normally urging the piston member 28 leftwardly to abuttingly engage the piston control portion leftward end 36 with the closure member 24. The piston member 28 is also provided with an axially aligned bore and counterbore 37, 38 therethrough, with said bore intersecting the piston body portion rightward end 33 and said counterbore intersecting the piston control portion leftward end 36, and another radial shoulder or valve seat 39 is formed at the juncture of said bore and counterbore. A plurality of radially extending passages 40 are provided in the piston body 29 adjacent the radial shoulder 31, having one of their ends intersecting the piston member bore 37 and the other ends thereof in pressure fluid communication with the housing counterbore 22.

A valve member, indicated generally at 41, is provided with a stem portion 42 slidably received in the piston member bore 37, and peripheral seals 43, 44 are carried by said stem portion adjacent the rightward end thereof in sealing engagement with said piston member bore. An enlarged valve head 45 is provided in the piston member counterbore 38 and is connected to the stem portion 42, and an annular seal 46 is carried by said valve head adjacent the periphery thereof for sealing engagement with the piston valve seat 39. A recess 47 is provided in the periphery of the stem portion 42 midway between the ends thereof and juxtaposed with the piston member passages 40. Also, a plurality of axially extending grooves 48 are provided in the periphery of the stem portion 42 connecting the recess 47 with the piston member counterbore 38.

A spring 49 is adjustably pre-compressed between the rightward end of the valve stem portion 42 and an adjustable retaining member 50 threadedly received in the rightward end of the piston member bore 37, said retaining member having a venting passage 51 therethrough connecting said piston member bore rightwardly of the valve member 41 with the housing bore 21 and the atmospheric venting passage 27. The spring 49 normally urges the valve member 41 leftwardly to abuttingly engage the valve head 45 with a stop ring and groove assembly 52 provided in the piston counterbore 38 adjacent the leftward end thereof and normally urging the valve head seal 46 away from the cooperating valve seat 39 on the piston member 28. With the valve 41 in its normal or original position, a pressure fluid passage 53 normally connecting the inlet and outlet ports 25, 26 in pressure fluid communication is defined by the housing counterbore 22, the piston passages 40, the recess 47 and the axial grooves 48 of the valve member 41 and the piston counterbore 38. It should be noted that an effective fluid pressure responsive area $A_1$ is provided by the area of the valve member 41 across the seal 43. Also, when the passage between the seal 46 and the valve seat 39 is closed, an effective fluid pressure responsive area $A_2$ is provided by the areas of the leftward ends of the valve head 45 and the piston control portion 36 across the seal 34. To complete the description of the control valve 5, it should also be noted that the area defined by the piston control portion leftward end 36 across the seal 34 minus the area defined by the valve member 41 across the seal 43 provides an effective fluid pressure responsive area $A_3$ ($A_3 = A_2 - A_1$) which is predeterminedly larger than the effective fluid pressure responsive area $A_4$ provided by the area defined by the piston control portion rightward end 31 across the seal 34 minus the area defined by the piston body portion 29 across the seal 32.

In the operation with the component parts of the control valve 5 in their normal positions, as shown in FIG. 2, and as described hereinabove, a manually applied force on the brake pedal 2 displaces pressure fluid from the master cylinder 3 through the conduits 4, 6, 7 and 8 into the wheel cylinders 9, 10 for initial energization of the front brake assemblies 11, 12. The displaced pressure fluid also flows from the conduit 4 through the inlet port 25 of the control valve 5 into the fluid pressure passage 53, which provides pressure fluid flow into the housing counterbore 22 rightward of the piston control portion 30, and therefrom through the passages 40 in the piston member 28, the recess 47 and the axial grooves 48 of the valve member 41, the passage formed between the valve seat 39 and the seal 46 into the piston member counterbore 38 and the housing counterbore 22 leftward of the piston control portion 30. The displaced pressure fluid flows from the housing counterbore 22 leftward of the piston control portion 30 through the outlet port 26, conduits 13, 14 and 15 into the wheel cylinders 16, 17 for initial energization of the rear brake assemblies 18, 19 substantially simultaneous with the front brake assemblies 11, 12.

The displaced fluid pressure acts on the effective area $A_3$ to establish a force $F_3$ and also acts on the effective area $A_4$ to establish another force $F_4$ in opposition to the force $F_3$ across the piston control portion 30. Since the effective area $A_3$ is predeterminately greater than the effective area $A_4$, the force $F_3$ overcomes the opposing force $F_4$ and urges the piston member 28 rightwardly toward a stored energy position, compressing or loading the energy storing spring 35 and increasing its force $Fs$. The displaced fluid pressure also acts on the effective area $A_1$ to establish a force $F_1$ urging the valve member 41 rightwardly in opposition to the force $Fr$ of the spring 49. When the displaced fluid pressure attains a predetermined value M, FIG. 3, the magnitude of the force $F_1$ overcomes the compressive force $Fr$ of the spring 49 thereby serving to move the valve member 41 rightwardly to a position sealably engaging the valve head seal 46 with the valve seat 39 interrupting pressure fluid communication through the passage 53 between the inlet and outlet ports 25, 26 of the control valve 5.

When the valve head seal 46 is in sealing engagement with the valve seat 39 to interrupt pressure fluid flow through the passage 53, the effective areas $A_1$ and $A_3$ are additive to equal the effective area $A_2$, as previously mentioned, and a force $F_2$ equivalent to the sum of the forces $F_1$ and $F_3$ is established by the outlet fluid pressure $Po$ at the outlet port 26 acting on the effective area $A_2$. The force $F_2$ is opposed and balanced by the force $F_4$ established by the input fluid pressure $Pi$ at the inlet port 25 acting on the effective area $A_4$ plus the compressive force $Fs$ of the spring 35. As the input fluid pressure $Pi$ is increased to a value greater than the predetermined fluid pressure M, the forces $F_4$ plus $Fs$ overcome the opposing force $F_2$ serving to concertedly move the piston member 28 and the valve member 41 leftwardly, thereby increasing the output fluid pressure $Po$ in a ratio to the input fluid pressure $Pi$, as shown by the formula:

$$Po = \frac{PiA_4 + Fs}{A_2}$$

It should be noted that as input fluid pressure $Pi$ is increased above the predetermined value M, and the piston member 28 is urged leftwardly, the spring 35 releases the stored energy and the effect of the force $Fs$ due to the decompressing or unloading of the spring 35 diminishes, and upon the input fluid pressure $Pi$ attaining a second predetermined value Q, the effect of the force $Fs$ is reduced to a negligible value and the output fluid pressure $Po$ is essentially increased in a ratio to the input fluid pressure $Pi$, as shown by the formula:

$$Po = Pi \frac{A_4}{A_2}$$

As illustrated by the graphical representations of the braking pressure in FIG. 3, until the displaced pressure fluid attains the predetermined value M, the output fluid pressure $Po$ from the ratio changer 5 to the rear wheel brake assemblies 18, 19 is in direct proportion, i.e., a 1:1 ratio, to the input fluid pressure $Pi$, as shown by the line OM. This predetermined fluid pressure M is equivalent to the fluid pressure required to overcome the inherent resistances of the fluid pressure system 1 and to initially energize the front and rear brake assemblies 11, 12 and 18, 19. When the predetermined fluid pressure M is attained, the spring 35 has moved to its stored energy or loaded position and the valve head seal 46 is moved into sealing engagement with the valve seat 39 to interrupt pressure fluid communication between the inlet and outlet ports 25, 26 and effect the ratio change between the input and output fluid pressures $Pi$, $Po$ as hereinabove described. As the input fluid pressure $Pi$ is increased above the predetermined value M, as illustrated by the line MQ, the force $F_4$ is increased which is additive to the release of energy or unloading of the spring 35 to increase the output fluid pressure $Po$, as illustrated by the line MQ', in the ratio of the first formula described hereinabove. The spring 35, in releasing the energy stored by it during the initial fluid pressure displacement, has the effect of providing a smooth transition during the ratio change between the input and output fluid pressures $Pi$, $Po$ and of assisting in the substantially simultaneous increase in the output fluid pressure $Po$ in proportion to increases in the input fluid pressure $Pi$. When the input fluid pressure $Pi$ attains the second predetermined value Q, the spring 35 has unloaded or released all or most of the stored energy, and the effect of the force $Fs$ is reduced to a negligible value and thereafter any increase in the input fluid pressure $Pi$ above the value Q, as illustrated by the line QX, to the control valve 5 will result in a proportional increase in the output fluid pressure $Po$, as illustrated by the line Q'N, in the ratio of the second formula described hereinabove. In this manner, the control valve 5 effects a ratio change between the input and output fluid pressures $Pi$, $Po$ so that the fluid pressure at the front brake assemblies 11, 12 above the predetermined value M will be predeterminately greater than the fluid pressure at the rear brake assemblies 18, 19. Therefore, the front brake assemblies 11, 12 are capable of applying a greater braking force than the rear brake assemblies 18, 19 to compensate for the inertia weight shift toward the front of the vehicle during a braking application.

When the desired braking application is obtained, the manually applied force is removed from the brake pedal 2 permitting the return flow of the displaced pressure fluid to the master cylinder 3. The front brake assemblies 11, 12 are de-energized by the displaced pressure fluid flowing from the wheel cylinders 9, 10 through the conduits 7, 8, 6 and 4 to the master cylinder 3. This return flow of the displaced pressure fluid also has the effect of eliminating the input fluid pressure $Pi$ at the inlet port 25 of the control valve 5 so that the force $F_4$ is eliminated and the force $F_2$ serves to concertedly move the valve member 41 and the piston member 28 rightwardly, thereby diminishing the value of output fluid pressure $Po$, and again loading the spring 35. When the output fluid pressure $Po$ is diminished to the value M, the force of the spring 49 urges the valve member 41 leftwardly to its original position, abuttingly engaging the valve head 45 with the stop ring and groove assembly 52 and disengaging the seal 46 from the valve seat 39 to again establish pressure fluid communication between the inlet and outlet ports 25, 26 of the control valve 5 through the passage 53. With the passage 53 open, the output fluid pressure $Po$ is eliminated, and the spring 35 urges the piston member 28 leftwardly to its original position abuttingly engaging the control portion leftward end 36 within the closure member 24. With the piston member 28 and the valve member 41 in their original positions, the rear brake assemblies 18, 19 are de-energized by the displaced pressure fluid flowing from the wheel cylinders 16, 17 through the conduits 15, 14 and 13 into the outlet port 26 of the control valve 5 and therefrom through the passage 53 to the inlet port 25. The return flow of displaced pressure fluid flows from the inlet port 25 through conduit 4 into the master cylinder 3, substantially simultaneous with the return flow from the front brake assemblies 11, 12, as previously described, to effect de-enerigzation of the front and rear brake assemblies 11, 12 and 18, 19 at the same time.

From the foregoing, it is now apparent that a novel control valve meeting the objects set out hereinbefore is provided and that changes or modifications as to the precise configurations, shapes and details of the construction set forth by way of illustration may be made by those skilled in the art without departing from the spirit of the invention, as defined by the claims which follow.

The embodiments of the invention in which an exclusive property or privilege is claimed are defined as follows:

1. A control valve comprising a housing having a bore and counterbore therein, inlet and outlet ports in said housing connecting with said counterbore, a piston slidable in said bore and having a free end defining with said bore an atmospheric chamber, said piston including an enlarged control portion opposite said free end and slidable in said counterbore intermediate said inlet and outlet ports, said control portion having opposed inlet and outlet ends respectively responsive to fluid pressure at said inlet and outlet ports, and said control portion inlet end having an effective fluid pressure responsive area predeterminately smaller than the effective fluid pressure responsive area of said opposed control portion outlet end, first resilient means in said housing urging said piston toward the outlet port, a bore and counterbore in said piston extending axially therethrough between said free end and said control portion outlet end, an annular valve seat on said piston at the juncture of said piston bore and counterbore, valve means including a stem portion slidable in said piston bore and a head portion movable in said piston counterbore, said valve means having an effective outlet end area responsive to fluid pressure at said outlet port and another end area opposed thereto subjected to the atmosphere in said atmospheric chamber, a seal on said head portion for sealing engagement with said valve seat, and groove means in the periphery of said stem portion having one end connected with the outlet port side of said control portion and the other end thereof connected to the inlet port side of said control portion, and second resilient means engaged with said valve means and normally urging said seal to a position disengaged from said valve seat to establish pressure fluid communication between said inlet and outlet ports through said groove means, said piston and said valve means being initially concertedly movable toward said inlet port against said first resilient means to store the energy thereof in response to fluid pressure at said inlet and outlet ports respectively acting on said inlet and outlet end piston areas, and said valve means being movable relative to said piston in response to a predetermined fluid pressure at said outlet port acting on said valve means outlet end area overcoming the force of said second resilient means to engage said seal with said valve seat interrupting pressure fluid communication between said inlet and outlet ports through said groove means, and said piston and said valve means being thereafter concertedly movable toward said outlet port in response to increases in the fluid pressure at said inlet port in excess of the predetermined fluid pressure acting on said piston inlet end area assisted by the stored energy of said first resilient means to increase the fluid pressure at said outlet port acting on the respective outlet end areas of said control portion and said valve means in a predetermined ratio to the fluid pressure at said inlet port.

2. The control valve according to claim 1 including abutment means in said piston counterbore for engagement with said valve head restricting the movement of said valve means from said valve seat, and adjustment means in said piston bore for controlling the force with which said second resilient means urges said valve means from said valve seat.

3. A control valve comprising a housing having a pair of ports therein, stepped piston means including a larger portion movable in said housing between said ports, opposed differential areas on said larger portion respectively subjected to fluid pressure at said ports, and a smaller portion movable in said housing extending from said larger portion and having a free end defining with said housing an atmospheric chamber, resilient means urging said piston means toward one of said ports, other means movable in said stepped piston means for controlling pressure fluid communication between said ports, other resilient means normally urging said other means toward said one port and toward a position establishing pressure fluid communication between said ports, and opposed effective areas on said other means respectively subjected to fluid pressure at said one port and to the atmosphere in said atmospheric chamber, said stepped piston means being movable toward the other of said ports against said first named resilient means to store the energy thereof in response to fluid pressure less than a predetermined value at said ports respectively acting on said opposed differential areas, said other means being movable against said other resilient means and the atmospheric pressure in said atmospheric chamber acting on one of said opposed effective areas toward said other port and a position interrupting pressure fluid communication between said ports when the fluid pressure at said one port acting on the other of said opposed effective areas attains the predetermined value, and said stepped piston means and other means being thereafter further movable toward said one port in response to further increases in the fluid pressure at said other port in excess of the predetermined value acting on one of said opposed differential areas and assisted by the stored energy of said first named resilient means to effect an increase in the fluid pressure at said one port in excess of the predetermined value acting on the other of said opposed differential areas and said other opposed effective area in a predetermined ratio with the increased fluid pressure in excess of the predetermined value at said other port.

4. The control valve according to claim 3, comprising abutment means on said piston means, said other resilient means normally urging said other means into engagement with said abutment means, and adjustment means adjustably movable in said piston means and engaged with said other means for controlling the force with which said other resilient means urges said other means into engagement with said abutment means.

5. The control valve according to claim 3, wherein said piston means and said other means define with said housing passage means between said ports, a valve seat on said piston means in circumscribing relation with said passage means, and said other means including valve means for engagement with said valve seat, said other resilient means normally urging said valve means to a position disengaged from said valve seat to establish pressure fluid communication between said ports and said valve means being movable with said other means against said other resilient means into engagement with said valve seat to interrupt pressure fluid communication between said ports.

6. A control valve comprising a housing having a pair of ports therein, stepped piston means including a larger portion movable in said housing between said ports, said larger portion having opposed ends defining opposed differential areas respectively subjected to fluid pressure at said ports, and a smaller portion movable in said housing and having a free end defining with said housing an atmospheric chamber, passage means in said stepped piston means between one of said opposed ends and said free end, a cross-passage in said piston means communicating said passage means with one of said ports between the other of said opposed ends and said free end, a valve seat on said stepped piston means between said one opposed end and said cross-passage and in circumscribing relation with said passage means, other means movable in said passage means between said cross-passage and free end including valve means for engagement with said valve seat, said other means having opposed effective areas respectively subjected to fluid pressure at the other of said ports and the atmosphere in said atmospheric chamber, resilient means urging said stepped piston means toward the other of said ports, and other resilient means engaged with said other means and normally urging said valve means toward a position disengaged from said valve seat to establish pressure fluid communication between said ports, said stepped piston means being movable toward said one port and against said first named resilient means to store the energy thereof in response to fluid pressure at said ports less than a predetermined value respectively acting on said opposed differential areas, said other means being movable against said other resilient means and the atmosphere in said atmospheric chamber acting on one of said opposed effective areas toward said one port to engage said valve means with said valve seat interrupting pressure fluid communication between said ports when the fluid pressure at said other port acting on the other of said opposed effective areas attains the predetermined value, and said stepped piston means and valve means being thereafter further movable toward said other port in response to increases in the fluid pressure at said one port in excess of the predetermined value acting on one of said opposed differential areas and assisted by the stored energy of said first named resilient means to effect an increase in the fluid pressure at said other port in excess of the predetermined value acting on the other of said opposed differential areas and said other opposed effective area in a predetermined ratio with the increased fluid pressure in excess of the predetermined value at said one port.

7. A control valve comprising a housing having a bore and counterbore therein, a shoulder on said housing between said bore and counterbore, inlet and outlet ports in said housing connected with said counterbore, a stepped piston including a head portion slidable in said counterbore between said inlet and outlet ports, said head portion having opposed ends defining opposed differential areas for respective subjection to fluid pressure at said inlet and outlet ports, and a sleeve portion connected with said head portion slidable in said bore and having a free end defining an atmospheric chamber in said bore, a pair of stepped bores in said stepped piston between one of the opposed ends of said head portion and the free end of said sleeve portion, another shoulder on said stepped piston between said stepped bores facing said outlet port and defining a valve seat, passage means in said sleeve portion having one end intersecting one of said stepped bores between said valve seat and said sleeve portion free end, resilient means engaged between said housing shoulder and said stepped piston urging said one end of said head portion toward said outlet port and into abutting engagement with said housing, valve means including a member slidable in said one stepped bore between said passage means and said sleeve portion free end, a stem portion on said member extending through said one stepped bore into the other of said stepped bores, and a valve head on said stem portion in said other stepped bore for engagement with said valve seat, said valve means having opposed effective areas for respective subjection to the atmosphere in said atmospheric chamber and fluid pressure at said outlet port, abutment means on said stepped piston in said other stepped bore for displacement preventing engagement with said valve head, and other resilient means in said one stepped bore engaged with said member and normally urging said valve head toward a position in displacement preventing engagement with said abutment means and disengaged from said valve seat to establish pressure fluid communication between said inlet and outlet ports, said stepped piston being movable toward said inlet port and against said first named resilient means to store the energy thereof in response to fluid pressure at said inlet and outlet ports less than a predetermined value respectively acting on said opposed differential areas, said valve means also being movable against said other resilient means and the atmosphere in said atmospheric chamber acting on one of the opposed effective areas in response to fluid pressure at said outlet port acting on the other of said opposed effective areas to engage said valve head with said valve seat isolating said inlet and outlet ports when the fluid pressure at said inlet and outlet ports is increased to the predetermined value, and said stepped piston and valve means being thereafter movable toward said outlet port in response to increases in the fluid pressure at said inlet port in excess of the predetermined value acting on one of said opposed differential areas and assisted by the stored energy of said first named resilient means to effect an increase in the fluid pressure at said outlet port in excess of the predetermined value acting on the other of said opposed differential areas and said other opposed effective area in a predetermined ratio with the increased fluid pressure in excess of the predetermined value at said inlet port.

References Cited

UNITED STATES PATENTS

| | | | |
|---|---|---|---|
| 2,892,468 | 6/1959 | Beuckle | 303—6 X |
| 3,245,221 | 4/1966 | James et al. | 303—6 X |
| 3,252,740 | 5/1966 | Stelzer | 303—6 |

MARTIN P. SCHWADRON, *Primary Examiner.*

R. R. BUNEVICH, *Assistant Examiner.*

UNITED STATES PATENT OFFICE
CERTIFICATE OF CORRECTION

Patent No. 3,358,445                          December 19, 1967

Eugene E. Wallace

It is hereby certified that error appears in the above numbered patent requiring correction and that the said Letters Patent should read as corrected below.

In the heading to the printed specification, lines 4 and 5, for "to Tung-Sol Electric Inc., Newark, N. J., a corporation of Delaware" read -- to Wagner Electric Corporation, South Bend, Ind., a corporation of Delaware --.

Signed and sealed this 21st day of January 1969.

(SEAL)
Attest:

Edward M. Fletcher, Jr.                      EDWARD J. BRENNER
Attesting Officer                            Commissioner of Patents